US012212899B2

(12) United States Patent
Srivastava et al.

(10) Patent No.: US 12,212,899 B2
(45) Date of Patent: Jan. 28, 2025

(54) SYSTEM AND METHOD FOR PROJECTOR GEOMETRIC CORRECTION

(71) Applicant: TEXAS INSTRUMENTS INCORPORATED, Dallas, TX (US)

(72) Inventors: Shivam Srivastava, Bangalore (IN); Jaime Rene De La Cruz Vazquez, Carrollton, TX (US); Jeffrey Matthew Kempf, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/344,979

(22) Filed: Jun. 30, 2023

(65) Prior Publication Data

US 2024/0080421 A1    Mar. 7, 2024

Related U.S. Application Data

(60) Provisional application No. 63/374,788, filed on Sep. 7, 2022.

(51) Int. Cl.
*H04N 9/31* (2006.01)
*H04N 23/90* (2023.01)

(52) U.S. Cl.
CPC ......... *H04N 9/3185* (2013.01); *H04N 9/3138* (2013.01); *H04N 23/90* (2023.01)

(58) Field of Classification Search
CPC .... H04N 9/3185; H04N 9/3138; H04N 23/90; H04N 9/3147; H04N 9/3182; H04N 9/3194
See application file for complete search history.

(56) References Cited

U.S. PATENT DOCUMENTS

| | | | | |
|---|---|---|---|---|
| 2014/0313423 | A1* | 10/2014 | Johnson | H04N 9/3194 348/745 |
| 2016/0292821 | A1* | 10/2016 | Cho | G06T 7/38 |
| 2017/0180689 | A1* | 6/2017 | Morrison | H04N 9/3194 |
| 2017/0337470 | A1* | 11/2017 | DeTone | G06T 7/12 |
| 2019/0073792 | A1* | 3/2019 | Fletcher | G01C 11/00 |
| 2020/0226771 | A1* | 7/2020 | Kaufman | G06T 7/194 |
| 2022/0044356 | A1* | 2/2022 | Zhong | G06T 3/4038 |
| 2022/0191442 | A1* | 6/2022 | De La Cruz Vazquez | H04N 9/3185 |

(Continued)

*Primary Examiner* — Michael Lee
(74) *Attorney, Agent, or Firm* — Michelle F. Murray; Frank D. Cimino

(57) ABSTRACT

An apparatus includes a first camera configured to capture a first image being displayed, a second camera configured to capture a second image being displayed, and a processor configured to generate a pair-wise homography transform for the first camera and the second camera, and map, based on the pair-wise homography transform, the second image from a second frame of reference of the second camera to a first frame of reference of the first camera. The processor is further configured to determine a first corrected quadrilateral for the first image and a second corrected quadrilateral for the second image in the first frame of reference, and project, based on the pair-wise homography transform, the second corrected quadrilateral from the first frame of reference to the second frame of reference. The quadrilaterals are then processed to warp respective images for geometric correction before projecting the images by respective projectors.

20 Claims, 11 Drawing Sheets

(56) References Cited

U.S. PATENT DOCUMENTS

2023/0098053 A1* 3/2023 Sudo ................. G06T 3/4038
  353/69
2023/0291877 A1* 9/2023 Someya ................ G09G 5/00

* cited by examiner

SYSTEM AND METHOD FOR PROJECTOR GEOMETRIC CORRECTION

CROSS-REFERENCE TO RELATED APPLICATIONS

The present application claims priority to U.S. Provisional Patent Application No. 63/374,788, which was filed Sep. 7, 2022, is titled "CAMERA ASSISTED GEOMETRIC CORRECTION FOR 2×2 PROJECTOR CONFIGURATION AUTO BLENDING ON PLANAR SURFACE," and is hereby incorporated herein by reference in its entirety.

BACKGROUND

Projection-based displays project images onto projection surfaces, such as onto a wall or a screen, to display video or pictures for viewing. Projection-based displays can include cathode-ray tube (CRT) displays, liquid crystal displays (LCDs), and spatial light modulator (SLM) displays such as digital mirror device (DMD) displays, etc. Projection-based displays also include near-eye displays for projecting images to the eye pupil, such as augmented reality (AR) or virtual reality (VR) displays in wearable devices.

SUMMARY

In accordance with at least one example of the disclosure, an apparatus includes a first camera configured to capture a first image of a first displayed image and having a first field of view, and a second camera configured to capture a second image of a second displayed image and having a second field of view. The apparatus also includes a processor coupled to the first camera and to the second camera and configured to generate a pair-wise homography transform for the first camera and the second camera, and map, based on the pair-wise homography transform, the second image from a second frame of reference of the second camera to a first frame of reference of the first camera. The processor also determines a first corrected quadrilateral for the first image in the first frame of reference, and determines a second corrected quadrilateral for the second image in the first frame of reference. The processor is further configured to geometrically project, based on the pair-wise homography transform, the second corrected quadrilateral from the first frame of reference to the second frame of reference of the second camera, geometrically project, based on a first image-to-camera homography transform, the first corrected quadrilateral from the first frame of reference of the first camera to a first projector frame of reference for projecting the first image, and geometrically project, based on a second image-to-camera homography transform, the second quadrilateral from the second frame of reference of the second camera to a second projector frame of reference for projecting the second image.

In accordance with at least one example of the disclosure, a method includes obtaining, by a processor, a first image from a first frame of reference and a second image from a second frame of reference and overlapping the first image, generating a pair-wise homography transform for the first image and the second image, wherein the pair-wise homography transform is based on shared image points in an overlap region between the first image and the second image, and mapping based on the pair-wise homography transform, the second image from the second frame of reference to the first frame of reference. The method further includes determining, by the processor, a first corrected quadrilateral and a second corrected quadrilateral for the respective first image and the second image in the first frame of reference, and geometrically projecting based on the pair-wise homography transform, the second corrected quadrilateral from the first frame of reference to the second frame of reference.

In accordance with at least one example of the disclosure, a system includes a first light modulator configured to project a first display image, and a second light modulator configured to project a second display image simultaneously with the first display image to display a combined image, where the first display image and the second display image are partially overlapping in the combined image. The system also includes a first camera configured to capture a first image of the combined image and having a first field of view, and a second camera configured to capture a second image of the combined image and having a second field of view. The system further includes a processor coupled to the first light modulator and the second light modulator and configured to generate a pair-wise homography transform for the first image and the second image, determine, in a common frame of reference for the first camera and the second camera, a first corrected quadrilateral for the first image and a second corrected quadrilateral for the second image based on the pair-wise homography transform, and geometrically project the first quadrilateral to a first projector frame of reference and the second quadrilateral to a second projector frame of reference based on a first homography transform and a second homography transform, respectively.

DETAILED DESCRIPTION

Figure 1:
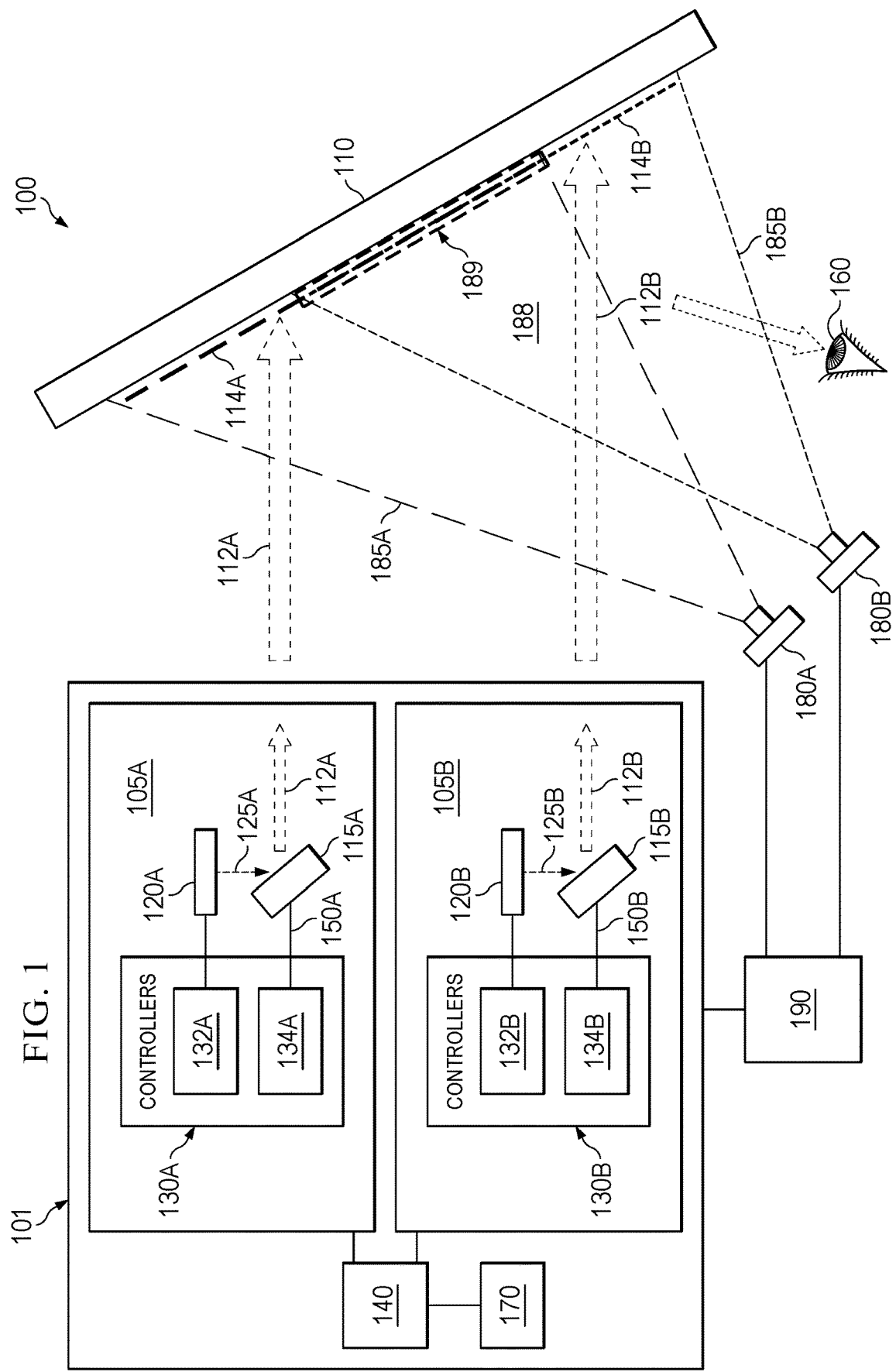
FIG. 1 is a diagram of a display system, in accordance with various examples.

Projector stacking is a projection-based display method for projecting and stacking images side by side, or overlaid on a same area, onto an image projection surface to display a combined image. The images are projected and aligned to overlap at least partially (e.g., at the image edges) to display a larger combined image and/or an image with higher brightness and/or resolution. Projector stacking includes aligning and edge blending the images to display a smooth or uninterrupted (e.g., seamless) combined image. Aligning the individual projected images, which can be distorted in the projection process, corrects the geometry of the images to produce the combined image without distortion.

Without geometric correction, the projected images can be skewed on the image projection surface according to the respective projection angles from the projectors to the image projection surface. The images can be geometrically corrected by aligning the relative positions of the projectors, and accordingly the respective projection angles of the projected images, with respect to the image projection surface. For example, the projectors can be aligned during a calibration process. Because the positions of the projectors are sensitive to shifts, such as because of movements, stresses, shocks, or vibrations in the projectors, the calibration process may be repeated over time to maintain the smooth or seamless nature of combined images.

The geometric correction of images can also be performed by image processing methods that are faster and more accurate than manually or mechanically aligning the projectors. Geometric correction based on image processing methods includes capturing initial projected images by one or more cameras, determining distortion information in the images, and processing to-be-projected images according to this information to mitigate the distortions in the displayed images. The image processing methods require the processing of multiple or different patterns of images to determine the image distortions, which can be computationally costly (e.g., in term of processing speed and time). Such methods can also depend on the relative positions of the cameras with respect to the projectors, which requires calibration.

This description includes examples suitable for the geometric correction of images with less complexity and computation cost in comparison to other image processing based geometric correction methods for projector stacking. The complexity and computation cost is reduced by processing fewer images and fewer image points in the initial captured images by respective cameras. The image points are obtained from overlap regions between fields of views of the cameras and processed to generate relative homography transforms between respective camera frames of reference, also referred to herein as pair-wise homography transforms. The pair-wise homography transforms represent the mapping of the image points between frames of reference of respective pairs of cameras. The mapping relationship between the frames of reference of the respective cameras is useful to map the images to a common camera frame of reference, which allows the geometric correction without calibrating the cameras. The images in the common camera frame of reference are then processed to determine corrected image geometries, also referred to herein as corrected quadrilaterals. The corrected quadrilaterals can then be processed for projecting new images after performing geometric correction for projector stacking. The new images can be processed, such as by an image warping engine, based on the corrected quadrilaterals to warp the new images prior to projection and accordingly compensate for the distortions in the display system. Projecting the warped new images produces aligned images with corrected geometries for displaying a new combined image according to projector stacking without distortion.

In some examples, the images processed based on the pair-wise homography transforms are two-dimensional images projected on a planar surface. This allows the processing of two images to obtain each pair-wise homography transform. A pair-wise homography transform for a pair of images can also be generated based on four image points from an overlap region between two fields of views of a respective pair of cameras. The four image points in the overlap region can be captured within the two fields of views. In other examples, a pair-wise homography transform can be generated with more than four image points.

In some examples, a pair of images is initially projected simultaneously in a 2×1 array to partially overlap on the image projection surface and display a combined image. A pair of cameras is configured (e.g., by adjusting the orientations of the cameras with respect to the image projection surface) with respective fields of views that are also partially overlapping to capture the pair of projected images. The four image points in the overlap region are captured by both cameras and processed to generate a pair-wise homography transform between the respective frames of reference of the two cameras. The captured images are processed to produce a pair of corrected quadrilaterals, which are processed in turn based on the pair-wise homography transform to perform the geometric correction for other to-be-projected pairs of images according to a 2×1 projector configuration. This method can be extended, such as by determining pair-wise homography transforms for multiple pairs of images, to display systems in a 2×2 projector configuration, or other projector configurations that project more images. In some examples, the images can partially overlap to form a larger combined image or can fully overlap to display an image with higher brightness and/or resolution.

FIG. 1 is a diagram of a display system 100, in accordance with various examples. The display system 100 includes a display device 101 which is a projection-based display that projects images or video for viewing. As shown in FIG. 1, the display device 101 includes projectors 105 (e.g., 105A and 105B) which are configured to project, simultaneously, respective images onto an image projection surface 110 in a certain projector configuration. For example, the display device 101 includes the projectors 105 stacked in a rack or an arm assembly to project the images in a 2×1 or 2×2 projector configuration. The image projection surface 110 can be a wall or a wall mounted screen. In other examples, the image projection surface 110 may be a screen of a heads up display (HUD), a projection surface in a vehicle such as a windshield, an outdoor environment such as a road, an AR or VR combiner, a three-dimensional (3D) display screen, or other display surfaces for projection-based display systems.

A projector 105 is configured to project a respective modulated light 112 onto the image projection surface 110 to display the respective image 114. For example, as shown in FIG. 1, the display device 101 includes two projectors 105A and 105B that project, according to a 2×1 projector configuration, two respective images 114A and 114B that are partially overlapping in a 2×1 array on the image projection surface 110. The partially overlapping images 114A and 114B are aligned on the image projection surface 110 to display a combined image. In other examples, the display device 101 includes four projectors 105 that project, according to a 2×2 projector configuration, four respective images 114 which partially overlap in a 2×2 array on the image projection surface 110. In further examples, the display device 101 includes other numbers of projectors 105 in a certain projector configuration to project respective images 114 that fully or partially overlap on the image projection surface 110. For example, the display device 101 can include three projectors 105 that project, according to a 3×1 projector configuration, three respective images 114 which partially overlap in a 3×1 array on the image projection surface 110. In general, the display device 101 can include L projectors 105 that project, according to a M×N projector configuration, L respective images 114 which partially overlap in a M×N array on the image projection surface 110, where M and N are integers and L=M×N.

Each modulated light 112 (e.g., 112A and 112B) can be modulated in each respective projector 105 (e.g., 105A and 105B) by each respective light modulator 115 (e.g., 115A and 115B) to project respective images 114 (e.g., 114A and 114B), such as video frames, onto the image projection surface 110. A light modulator 115 can be a microelectromechanical system (MEMS) based SLM, such as a DMD, or a liquid crystal-based SLM, such as an LCD or a liquid crystal on silicon (LCoS) device. Each light modulator 115 (e.g., 115A and 115B) modulates the intensity of a light from one or more respective light sources 120 (e.g., 120A and 120B) based on optical elements that are controlled to manipulate the light and accordingly form the pixels of a respective displayed image 114 (e.g., 114A and 114B). In some examples, the light modulator 115 is a DMD, where the optical elements are adjustable tilting micromirrors that are tilted by applying voltages to the micromirrors through respective electrodes. The micromirrors are tilted to project dark pixels or bright pixels with color shades. In other examples, the light modulator 115 is an LCD or an LCoS device, where the optical elements are liquid crystals that are controlled by voltage to modulate the intensity of light across the image pixels. The intensity of light is modulated by applying voltage to the liquid crystals, which reorients the crystals, also referred to herein as switching the crystals, and accordingly controls the amount of light projected per pixel. The optical elements can be a transmissive array of liquid crystal cells such as in an LCD, or a reflective array of liquid crystal cells such as in an LCoS device. The cells of liquid crystals can be controlled by voltages, through respective electrodes, to modulate light.

In other examples, the light modulator 115 can be a phase light modulator (PLM) or a ferroelectric liquid crystal on silicon (FLCoS) device. A PLM can be a MEMS device including micromirrors that have adjustable heights with respect to the PLM surface. The heights of the micromirrors can be adjusted by applying voltages. The micromirrors may be controlled with different voltages to form a diffraction surface on the PLM. For example, each micromirror can be coupled to respective electrodes for applying a voltage and controlling the micromirror independently from the other micromirrors of the PLM. The diffraction surface is a phase altering reflective surface to light incident from one or more light sources 120 onto the surface of the light modulator 115. The phase altering reflective surface represents a hologram for projecting illumination patterns of light that form an image on an image projection surface. The hologram is formed as a diffraction surface by adjusting the heights of the micromirrors of the PLM. The hologram is formed based on an image that is to be displayed by projecting the light on the image projection surface 110. An FLCoS device includes ferroelectric liquid crystals (FLCs) that have a faster voltage response than other liquid crystal devices (e.g., LCDs and LCoS devices) and accordingly can project images at a higher rate. Other examples of the light modulator 115 include micro-light emitting diodes (micro-LEDs) and micro-organic light emitting diodes (micro-OLEDs).

The modulated light 112 can be formed as a combination of color modes (e.g., blue, green, and red) from an incident light 125, which is generated by one or more light sources 120. For example, three color modes can provide three basic color components for displaying an image in full color. The color modes in the incident light 125 can be transmitted concurrently or by time multiplexing the light sources 120. The incident light 125 with the different color modes is modulated by the light modulator 115 in the projector 105 to produce the modulated light 112 for displaying images 114 or video on the image projection surface 110.

In other examples, the display device 101 can include a single projector 105 including multiple light modulators 115 that each forms a respective modulated light 112. Each light modulator 115 (e.g., 115A and 115B) of the display device 101 can be optically coupled to respective light sources 120 (e.g., 120A and 120B) and to respective controllers 130 (e.g., 130A and 130B) or the same controller 130. In some examples, the light modulators 115 can share a single light source 120. The projector 105 includes one or more controllers 130 configured to control the light modulator 115 and the light sources 120 to display the images 114 or video. For example, each controller 130 (e.g., 130A and 130B) can include a respective first controller 132 (e.g., 132A and 132B) for controlling the respective light sources 120 (e.g., 120A and 120B) to transmit a respective incident light 125 (e.g., 125A and 125B) concurrently or consecutively by time multiplexing. The controllers 130 (e.g., 130A and 130B) can also include a respective second controller 134 (e.g., 134A and 134B) for controlling a respective light modulator 115 (e.g., 115A and 115B) to modulate the respective incident light 125 (e.g., 125A and 125B) from the respective light sources 120 (e.g., 120A and 120B).

The first controller 132 and the second controller 134 can be different controllers. The first controller 132 can be a digital controller configured to switch the light sources 120 on and off. In other examples, the first controller 132 can be an analog controller that changes the level of light intensity of the incident light 125 from the light sources 120. The analog controller can also transmit pulse width modulation (PWM) signals to the light modulator 115 to synchronize the adjustment of the optical elements in the light modulator 115 with the transmission of the incident light 125 from the light sources 120. The second controller 134 may be an analog or a digital controller that switches the optical elements of the light modulator 115. For example, the second controller 134 is an analog controller or a digital controller that switches the angles of micromirrors of an SLM or the heights of micromirrors of a PLM. In some examples, the second controller 134 is a digital controller coupled to a static random access memory (SRAM) (not shown) including an array of memory cells each configured to store voltage values, such as in bits, to adjust respective micromirrors of an SLM or a PLM. The micromirrors can be adjusted according to the bit values in the corresponding SRAM cells, such as based on PWM signals from the first controller 132. In other examples, the light modulator 115 is an LCD, an LCoS device, or a FLCoS device and the optical elements are liquid crystals that are controlled by the second controller 134 to modulate the incident light 125 across the image pixels.

The display device 101 also includes a processor 140 configured to process images and produce processed images for projection. The processed images can be projected by the light modulators 115 simultaneously according to a certain projector stacking configuration. For example, the images include image data that represent a sequence of frames of images, such as video frames at a certain display rate. The processed images can be digital images useful to provide control signals from the controllers 130 to the light modulators 115 and the light sources 120. The second controllers 134 in the projectors 105 can receive from the processor 140 the image data in the form of a sequence of frames and produce display image data based on the received image data. The display image data are transmitted from each second controllers 134 (e.g., 134A and 134B) to the respective light modulator 115 (e.g., 115A and 115B) on a respective interface 150 (e.g., 150A and 150B). The second controllers 134 is configured to provide control signals based on the display image data to the light modulators 115, which then modulate the incident light 125 according to the control signals to display video or images 114. The light modulators 115 projects the modulated light 112 on the image projection surface 110 to display the images 114 for viewing by a human eye 160, also referred to herein as the human visual system (HVS) pupil.

The display device 101 also includes an image warping engine 170 configured to warp images based on corrected quadrilaterals, which can be determined from initially projected images 114. The warped images are projected simultaneously by respective light modulators 115 to produce, on the image projection surface 110, aligned images without distortion and accordingly a combined image with a corrected geometry. The image warping engine 170 can be coupled to the processor 140 that processes the warped images for projection. In other examples, the image warping engine 170 can be part of the processor 140. For example, the image warping engine 170 and the processor 140 can be coupled to or integrated in one or more electronic chips.

The display system 100 also includes cameras 180 (e.g., 180A and 180B) configured to capture the overlapping images 114 (e.g., 114A and 114B), respectively. In some examples, the projectors 105 (e.g., 105A and 105B) can be packaged separately, and each camera 180 (e.g., 180A and 180B) can be packaged with or coupled to a respective projector 105. The camera 180 can be positioned arbitrarily in the display system 100 independent of the positions of the projectors 105 or the display device 101. A camera 180 can also be arbitrarily positioned with respect to another camera 180. The cameras 180 (e.g., 180A and 180B) have respective fields of views 185 (e.g., 185A and 185B) that are aligned, by orienting the cameras 180 accordingly, with the respective images 114. Because the images 114 overlap, the fields of views 185 of the cameras 180 are also aligned to overlap. Accordingly, a camera 180 can fully capture a respective image 114 and a portion of one or more other images 114. For example, a pair of cameras 180 capture, within an overlap region 188 between the respective fields of views 185, an overlap region 189 of a pair of images 114 on the image projection surface 110. The cameras 180 are coupled to a processor 190 configured to generate, based on the captured images 114, one or more pair-wise homography transforms and determine, based on the transforms, corrected quadrilaterals for the respective images 114. The processor 190 can be coupled to the display device 101 to provide the corrected quadrilaterals to the image warping engine 170. In other examples, the image warping engine 170 and the processor 190 can be combined in a single apparatus that is coupled to or located in the display device 101. For example, one or more electronic chips including the image warping engine 170 and the processor 190 can be coupled to or integrated with the processor 140. The display device 101 can further include one or more input/output devices (not shown), such as an audio input/output device, a key input device, a display, and the like.

Figure 2:
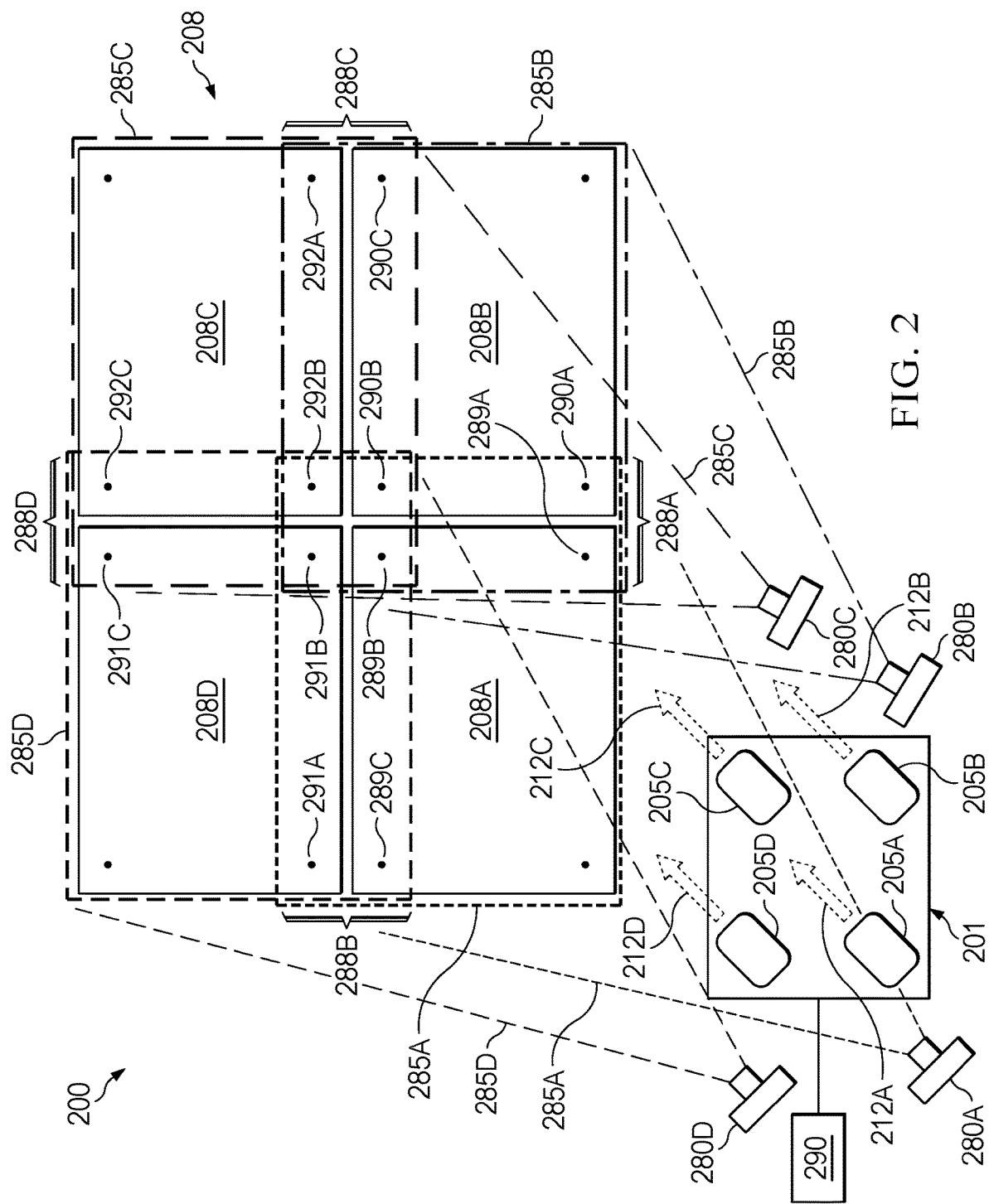
FIG. 2 is a diagram of a display system, in accordance with various examples.

FIG. 2 is a diagram of a display system 200, in accordance with various examples. The display system 200 can be an example of the display system 100 or a display system configured similar to the display system 100 according to a 2×2 projector configuration for projecting simultaneously four overlapping images in a 2×2 array on the image projection surface 110. The display system 200 includes the display device 201 for projecting images or video with projector stacking. The display device 201 in the display system 200 can be an example of the display device 101 in the display system 100 or configured similar to the projector the display system 100. The display device 201 includes projectors 205 configured to project, simultaneously, respective images 208 in a 2×2 projector configuration. A projector 205 is configured to project a respective modulated light 212 to display a respective image 208. The projectors 205 in the display system 200 can be an example of the projectors 105 in the display system 100 or configured similar to the projectors 105. As shown in FIG. 2, the display device 201 includes four projectors 205 (e.g., 205A to 205D) that project four respective images 208 (e.g., 208A to 208D) that partially overlap in a 2×2 array on an image projection surface 110 (not shown in FIG. 2). The partially overlapping images 208 are aligned to display a larger combined image. In FIG. 2, the images 208 are shown at a plane parallel to the image projection surface 110.

The display system 200 also includes four cameras 280 (e.g., 280A to 280D) configured to capture the images 208A to 208D, respectively. The cameras 280 in the display system 200 can be an example of the cameras 180 in the display system 100 or configured similar to the cameras 180. The cameras 280 can be positioned arbitrarily in the display system 200 independent of the positions of the projectors 205 or the display device 201. A camera 280 can also be arbitrarily positioned with respect to other cameras 280. The cameras 280A to 280D have respective fields of views 285A to 285D that are aligned with the images 208A to 208D, respectively. Each camera 280 can fully capture a respective image 208 and a portion of one or more other images 208.

For example, the camera 280A captures, within the field of view 285A, the image 208A projected by the modulated light 212A from the projector 205A. The camera 280A can also capture, within the field of view 285A, a bottom portion of the image 208D and left portions of the image 208B and the image 208C. The camera 280B captures, within the field of view 285B, the image 208B projected by the modulated light 212B from the projector 205B. The camera 280B can also capture, within the field of view 285B, a bottom portion of the image 208C and right portions of the image 208A and the image 208D. The camera 280C captures, within the field of view 285C, the image 208C projected by the modulated light 212C from the projector 205C, and can also capture a top portion of the image 208B and left portions of the image 208A and the image 208D. The camera 280D can capture, within the field of view 285D, the image 208D projected by the modulated light 212D from the projector 205D, a top portion of the image 208A, and right portions of the image 208C and the image 208D.

As shown in FIG. 2, a first overlap region 288A between the fields of views 285A and 285B of the cameras 280A and 280B, respectively, includes image points 289A and 289B along the right edge of the image 208A and image points 290A and 290B along the left edge of the image 208B. A second overlap region 288B between the fields of views 285A and 285D of the cameras 280A and 280D, respectively, includes image points 289B and 289C along the top edge of the image 208A and image points 291A and 291B along the bottom edge of the image 208D. A third overlap region 288C between the fields of views 285B and 285C of the cameras 280B and 280C, respectively, includes image points 290B and 290C along the top edge of the image 208B and image points 292A and 292B along the bottom edge of the image 208C. A fourth overlap region 288D between the fields of views 285C and 285D of the cameras 280C and 280D, respectively, includes image points 291B and 291C along the right edge of the image 208D and image points 292B and 292C the left edge of the image 208C.

In some examples, the image points in the overlap regions captured by a pair of cameras, such as a pair of cameras 280 or 180, are useful to determine a mapping relationship of image points between the frame references of the respective cameras. The frame of reference of a camera represents mathematically a two-dimensional plane (e.g., Cartesian plane) for positioning the image points of an image in the camera plane. For example, the image points 289A, 289B, 290A, and 290B in the overlap region 288A can be processed by the processor 290 to establish a mapping relationship between the images 208A and 208B in the frames of reference of cameras 280A and 280B, respectively. The mapping relationship can be represented mathematically by a pair-wise homography transform, which is a transfer function that maps the positions of the image points of an image between respective frames of reference of respective cameras. Similarly, the image points 289B, 289C, 291B, and 291A in the overlap region 288B can be processed to establish a pair-wise homography transform between the frames of reference of cameras 280A and 280D. The image points 290B, 290C, 292B, and 292A in the overlap region 288C can be processed to establish a pair-wise homography transform between the frames of reference of cameras 280B and 280C. The image points 291B, 291C, 292B, and 292C in the overlap region 288D can also be processed to establish a pair-wise homography transform between the frames of reference of cameras 280D and 280C.

Figure 3:
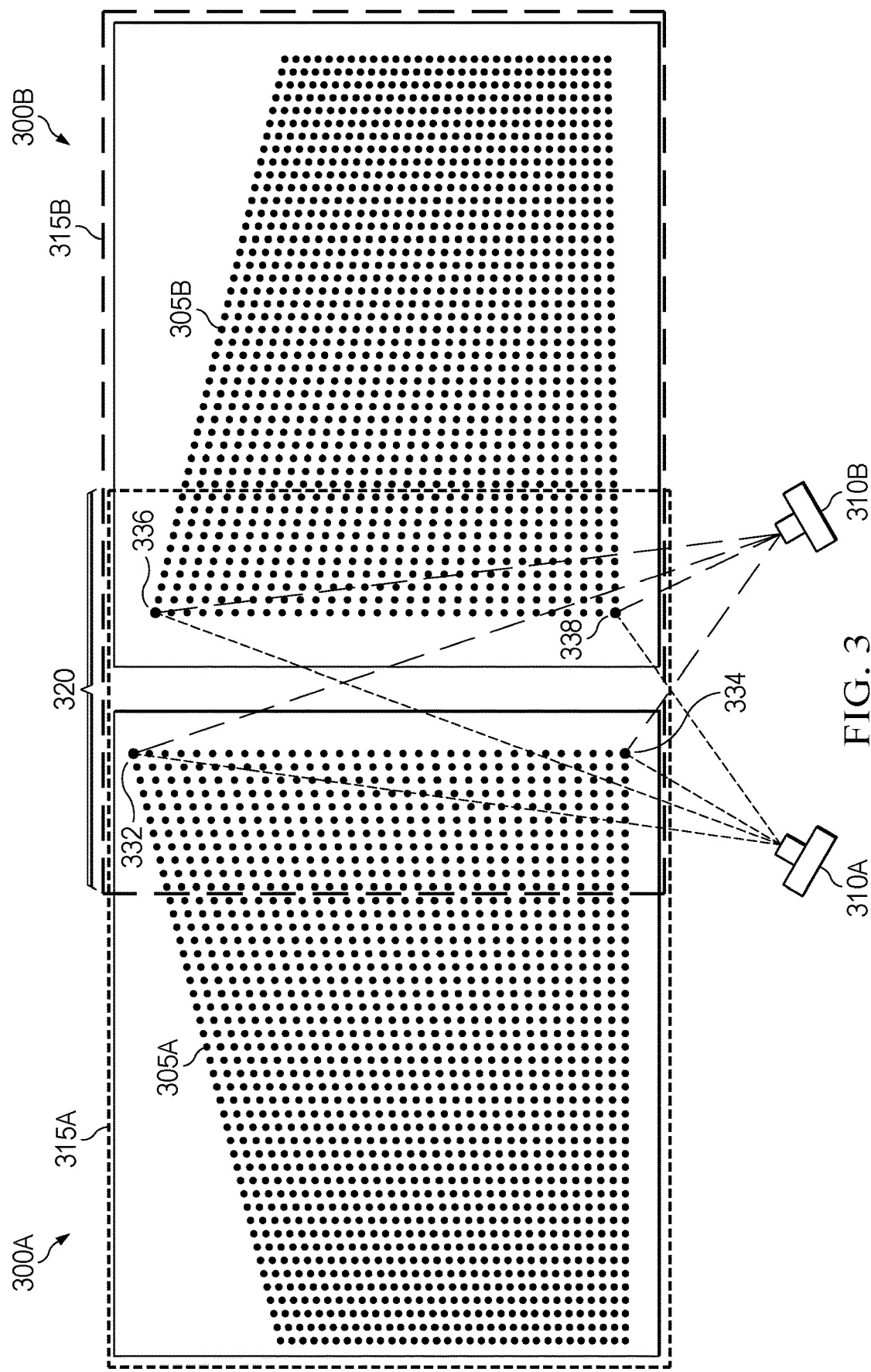
FIG. 3 is a diagram of frames of reference of a pair of respective cameras, in accordance with various examples.

FIG. 3 is a diagram of frames of reference 300A and 300B of a pair of respective cameras 310A and 310B, in accordance with various examples. The frames of reference 300A and 300B represent two-dimensional planes (e.g., Cartesian planes) where the coordinates of image points are set for respective images 305A and 305B captured by the cameras 310 and 310B, respectively. The frame of references 300A and 300B are maintained by the cameras 310A and 310B, respectively, such as by a processor and a memory coupled to the cameras 310A and 310B. The cameras 310A and 310B can be a pair of cameras in the display system 200 or the display system 100. For example, the cameras 310A and 310B can be the cameras 180A and 180B, the cameras 280A and 280B, or the cameras 280D and 280C, respectively. The pair of cameras 310A and 310B are configured to capture, respectively, the images 305A and 305B within the respective fields of view 315A and 315B. The fields of view 315A and 315B partially overlap in an overlap region 320. The overlap region 320 includes image points (represented by dots in the images 305A and 305B) captured by both cameras 310A and 310B, also referred to herein as share image points. As shown in FIG. 3, the image points of the images 305A and 305B can represent skewed images in the frames of reference 300A and 300B, respectively. The images 305A and 305B can be distorted (e.g., skewed) because of the orientation of the cameras 310A and 310B with respect to an image projection surface (not shown in FIG. 3). The images 305A and 305B can also be distorted by the orientation of the respective projectors (not shown in FIG. 3) that project the images 305A and 305B onto the image projection surface. In some examples, the images 305A and 305B are partially overlapping on the image projection surface plane (not shown), and the shared image points can be located in an overlap region between the images 305A and 305B on the image projection surface plane.

The shared image points captured by both cameras 310A and 310B can be processed to generate a pair-wise homography transform between the frames of reference 300A and 300B. In some examples, the pair-wise homography transform can be generated from four image points in the overlap region 320 that are captured by both cameras 310A and 310B. The four image points include a top right image point 332 and a bottom right image point 334 of the image 305A and also include a top left image point 336 and a bottom left image point 338 of the image 305B.

In examples, a display system, such as the display system 100 or 200, can include multiple pairs of light modulators or projectors (e.g., light modulators 115 or projectors 205) that project respective pairs of overlapping images according to a projector stacking configuration. Accordingly, a pair-wise homography transform can be generated for each pair of images, such as the pair of images 305A and 305B, based on four shared image points in the respective overlap region, such as the image points 332, 334, 336, and 338 in the overlap region 320. Each pair-wise homography transform is also generated independently from image points outside the overlap region.

For example, the display system 200 projects four images 208 in a 2×2 projector configuration which partially overlap on an image projection surface. Each image 208 is then captured by a respective camera 280 within a respective field of view 285. The four cameras 280 also capture, in the respective overlap regions 288A to 288D, at least four shared image points between the images 208. Based on the shared image points in the respective overlap regions 288A to 288D, four pair-wise homography transforms can be generated for four pairs of images 208. In each of the overlap regions 288, four image points are sufficient to calculate a respective pair-wise homography transform for each pair of cameras 280. Since no more than four image points are needed to determine each pair-wise homography transform for geometric correction, the field of view of each camera 280 can be limited to capture the respective image with the edges of other images, which simplifies the setup and calibration of the display system.

Figure 4:
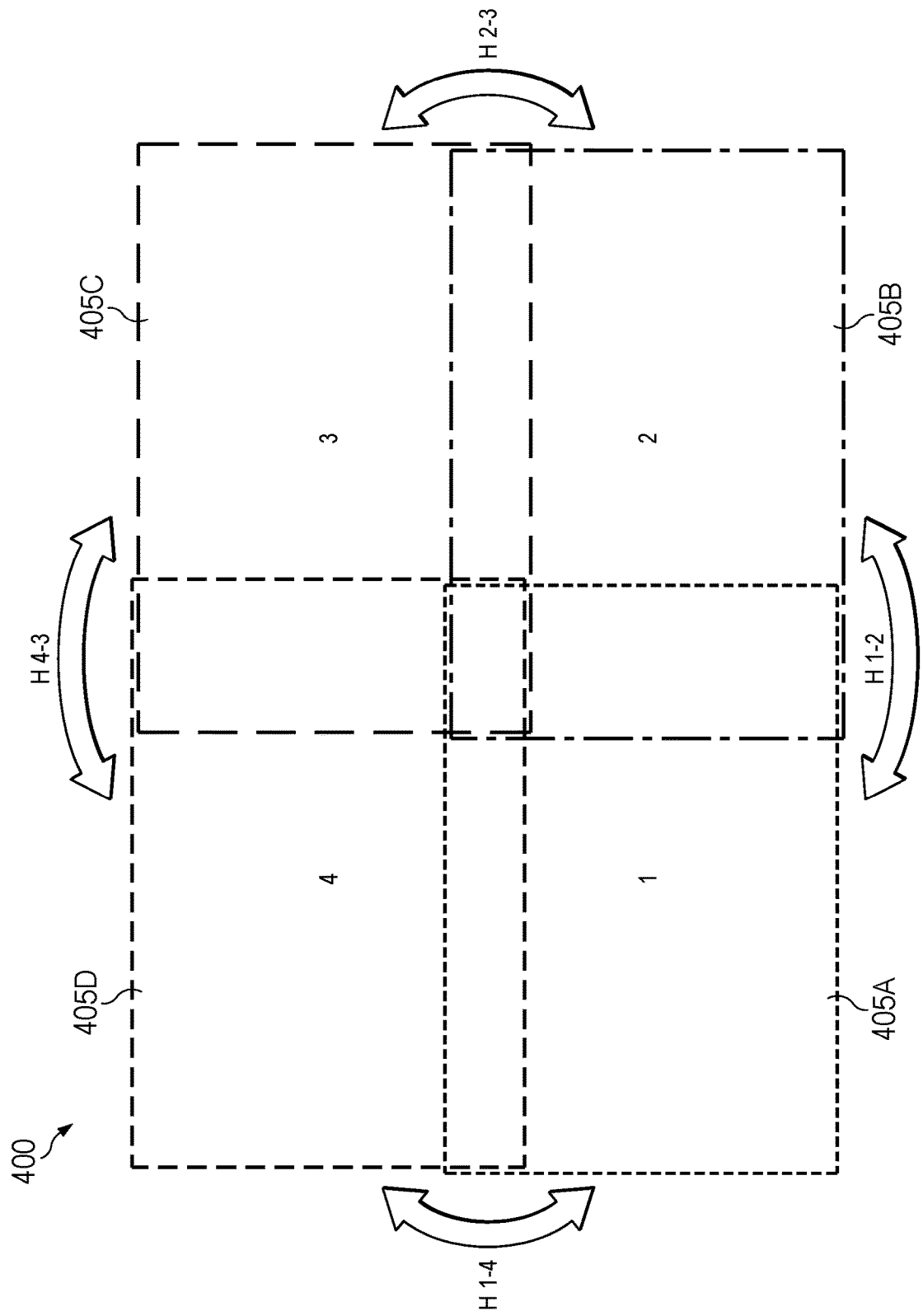
FIG. 4 is a diagram of pair-wise homography transforms for a 2×2 array of images, in accordance with various examples.

FIG. 4 is a diagram of pair-wise homography transforms 400 for a 2×2 array of images 405 (405A to 405B), in accordance with various examples. The four images 405A to 405B (labeled 1 to 4) partially overlap on a plane of an image projection surface, as shown in FIG. 4. A pair-wise homography transform 400 can be generated for each pair of images 405 based on four shared image points which can be obtained from a group of shared image points in the overlap region between respective fields of views of the cameras. For example, a first pair-wise homography transform (H 1-2) can be generated based on four shared image points from a group of share image points between a first pair of images 405A and 405B in an overlap region captured by a first camera and a second camera. Similarly, a second pair-wise homography transform (H 2-3) can be generated based on shared respective image points between a second pair of images 405B and 405C captured by the second camera and a third camera. The pair-wise homography transform 400 also include a third pair-wise homography transform (H 4-3) for a third pair of images 405D and 405C captured by a fourth camera and the third camera, and a fourth pair-wise homography transform (H 1-4) for a fourth pair of images 405A and 405D captured by the first camera and the fourth camera.

The pair-wise homography transforms 400 are mathematical transformations between two camera frames of reference, which are two-dimensional planes. Such transformations can be represented by 3×3 transformation matrices in a homogenous coordinate space, such as Cartesian space. For example, a pair-wise homography matrix is generated by solving the following equation (1):

$$\begin{bmatrix} x_a \\ y_a \\ 1 \end{bmatrix} = H * \begin{bmatrix} x_b \\ y_b \\ 1 \end{bmatrix} = \begin{bmatrix} h11 & h12 & h13 \\ h21 & h22 & h23 \\ h31 & h32 & 1 \end{bmatrix} * \begin{bmatrix} x_b \\ y_b \\ 1 \end{bmatrix}, \quad (1)$$

where $x_a$, $y_a$ are coordinates of an image point in a first frame of reference, and $x_b$, $y_b$ are coordinates of an image point in a second frame of reference. The parameters of the pair-wise homography transform, H, can be calculated by solving equation (1) with coordinates of four shared image points in the overlap region between respective fields of views of the cameras. The parameters of the pair-wise homography transform are also calculated without and independently from image points outside the overlap region.

The four pair-wise homography transforms H 1-2, H 2-3, H 4-3, and H 1-4, are useful to map the images 405A to 405D to a common camera frame of reference. The common camera frame of reference refers herein to the frame of reference set in one of the cameras that capture the respective images. For example, the images 405B to 405D can be mapped to a first frame of reference (labeled 1 in FIG. 4) of the first camera as a common frame of reference. The image 405A is captured by the first camera in the first frame of reference without applying a homography transform. The image 405B is mapped from a second frame of reference (labeled 2) of the second camera to the first frame reference of the first camera by applying H 1-2 to the image points of the image 405B. The image 405D is mapped from a fourth frame of reference (labeled 4) of the fourth camera to the first frame reference by applying H 1-4 to the image points of the image 405D. The image 405C is mapped from a third frame of reference (labeled 3) of the third camera to the first frame reference by applying a fifth pair-wise homography transform between the first frame of reference and the fourth frame of reference. The fifth pair-wise homography transform (H 1-3) can be calculated based on H 1-4 and H 4-3, such as according to the following mathematical equation (2):

$$H1\text{-}3 = H1\text{-}4 \times H4\text{-}3. \quad (2)$$

The fifth pair-wise homography transform (H 1-3) can also be calculated based on H 1-2 and H 2-3 according to H 1-3=H 1-2×H 2-3. Mapping the images 405A to 405D to a common camera frame of reference allows determining corrected quadrilaterals for the images 405A to 405D, respectively, which are useful for warping to-be-projected images and accordingly correcting the geometry in the displayed images or combined image.

The pair-wise homography transforms, each calculated based on four image points according to equation (1), reduce the computation complexity and cost for geometric correction in comparison to other geometric correction methods for projector stacking. For example, a single image can be captured for each projector to perform the geometric correction based on the pair-wise homography transforms. The images can then be mapped based on the pair-wise homography transforms to a common camera frame of reference to calculate the corrected quadrilaterals without calibrating the cameras. In comparison, other geometric correction methods may require multiple images with a larger number of image points to calibrate the cameras, which increases the computation complexity and cost, such as in terms of storage space and processing time.

Figure 5A:
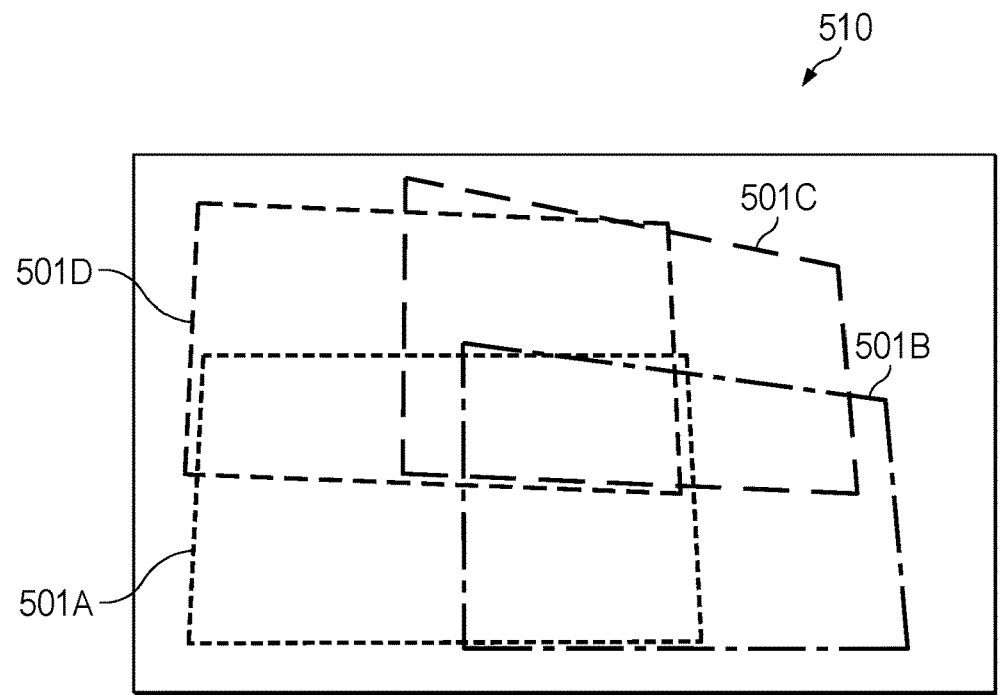
FIGS. 5A to 5F are diagrams of a process of determining corrected quadrilaterals for a 2×2 array of images, in accordance with various examples.
Figure 5B:
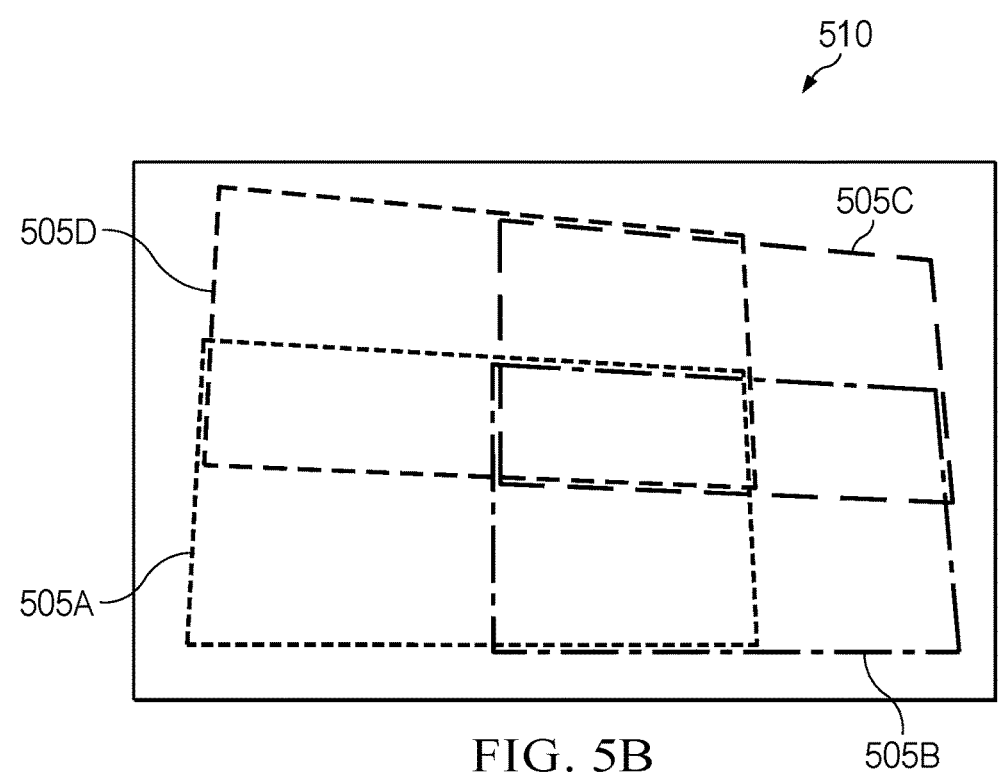

FIGS. 5A to 5F are diagrams of a process of determining corrected quadrilaterals 505 for a 2×2 array of images 501, in accordance with various examples. FIG. 5A shows the images 501 (501A to 501D) mapped, based on pair-wise homography transforms, to a common camera frame of reference 510. FIG. 5B shows the respective corrected quadrilaterals 505 (505A to 505D) in the common camera frame of reference 510. The corrected quadrilaterals 505 in FIG. 5B can be determined from the images 501 in FIG. 5A by a series of geometric calculations shown in FIGS. 5C to 5F.

Figure 5C:
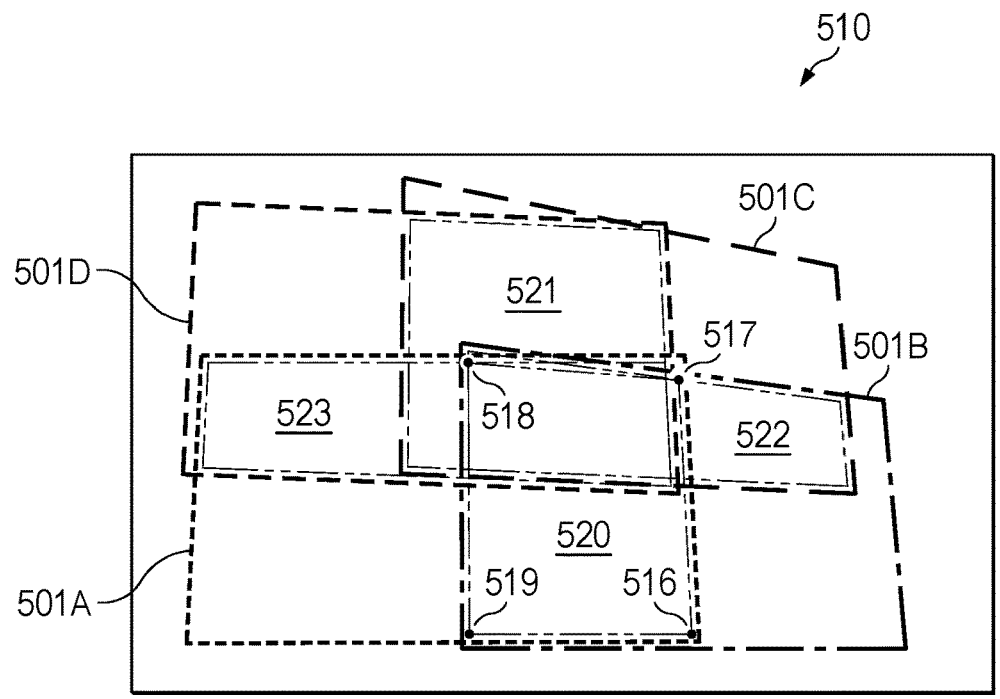

The geometric calculations include first determining the intersections of image sides for each pair of images 501, as shown in FIG. 5C. The determined intersection points for each pair of images 501 form a respective interior frame for the pair. As shown in FIG. 5C, for the pair of images 501A and 501B, the intersection of the right side of the image 501A with the image 501B is determined at the bottom right corner 516 of the image 501A and at the intersection 517 of the right side of the image 501A and the top side of the image 501B. The intersection of the left side of the image 501B with the image 501A is determined at the intersection 518 of the left side of the image 501B and the top side of the image 501A and at the bottom left corner 519 of the image 501B. Connecting the points at the bottom right corner 516, the intersection 517, the intersection 518, and the bottom left corner 519 determines a first interior frame 520 for the pair of images 501A and 501B.

In some examples, the four points at the respective corners 516 to 519 of the first interior frame 520 are obtained based on a center of gravity (COG) calculation. The COG calculation is useful for any orientations of projectors of the images with respect to the image projection surface. The COG point represents the balance point or the average position of all the points in the images 501A to 501D. The steps of COG calculation include extrapolating the sides of the images 501A to 501D to obtain eight intersection points, and calculating a COG point for the eight intersection points. For each of the eight intersection points, a respective Euclidean distance can be calculated with the COG point. From the eight intersection points, four intersection points with the shortest respective Euclidian distances can then be selected as the four corners 516 to 519 that determine the first interior frame 520. Similarly, in FIG. 5C, a second interior frame 521 is determined for the pair of images 501C and 501D, a third interior frame 522 is determined for the pair of images 501B and 501C, and a fourth interior frame 523 is determined for the pair of images 501A and 501B.

Figure 5D:
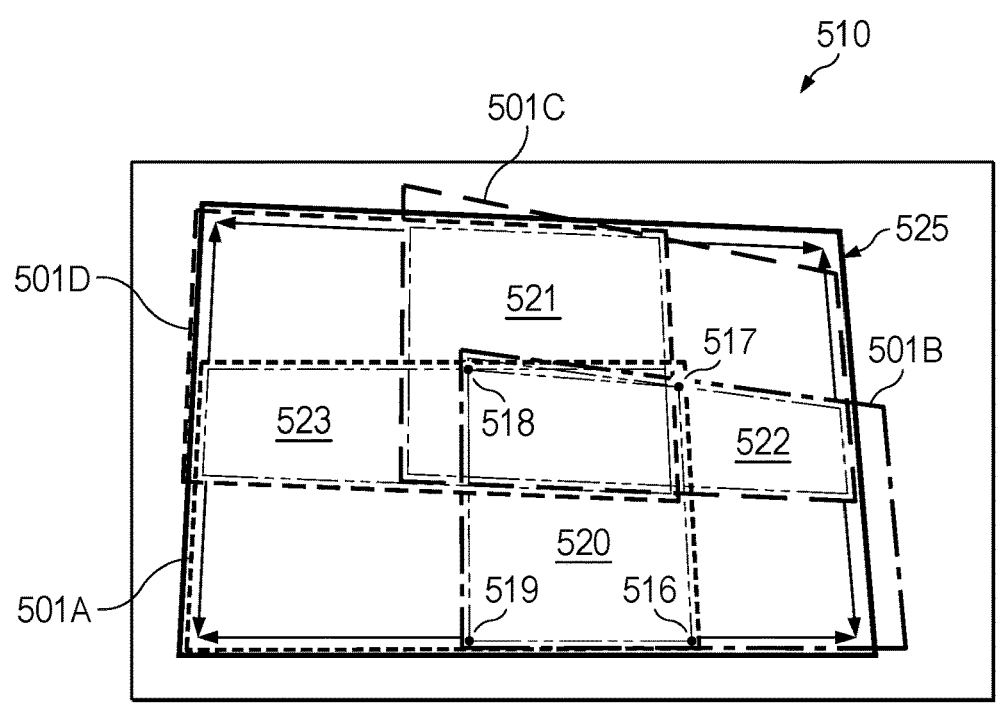

FIG. 5D shows a next step of the geometric calculations where an overall exterior frame 525 for the images 501 can be determined based on the interior frames 520 to 523. The exterior sides of the interior frames 520 to 523 are extrapolated to intersect with the exterior sides of the images 501 (shown by the arrows in FIG. 5D). The intersection points form the overall exterior frame 525. In other examples, to determine the overall exterior box, four points can be selected based on a COG calculation from a larger group of intersection points. The steps of the COG calculation include extrapolating the exterior sides of the determined interior frames to obtain the group of intersection points. A COG point is then calculated for the group of intersection points, and accordingly, a respective Euclidean distance is obtained for each of the intersection points. Four intersection points with the shortest respective Euclidian distances can then be selected from the group of intersection points to determine an overall exterior frame.

Figure 5E:
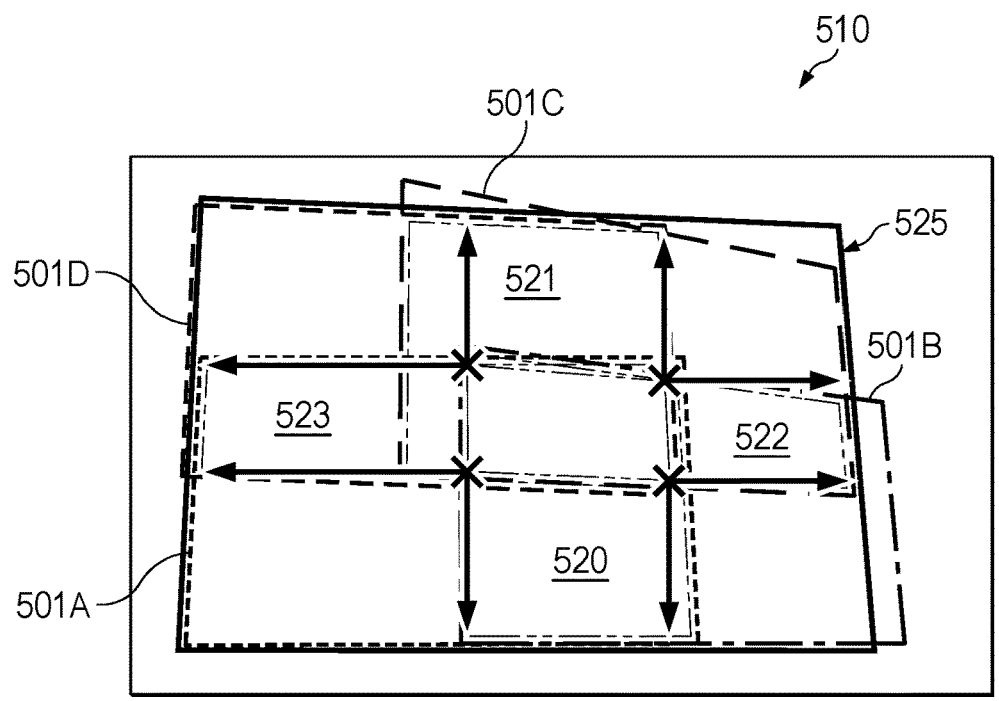

FIG. 5E shows a next step of the geometric calculations where four intersection points of the interior frames 520 to 523 can then be determined (shown by the 'X' markers in FIG. 5E). The lines connecting the intersection points are then extrapolated to intersect with the sides of the overall exterior frame 525 (shown by the arrows in FIG. 5E).

Figure 5F:
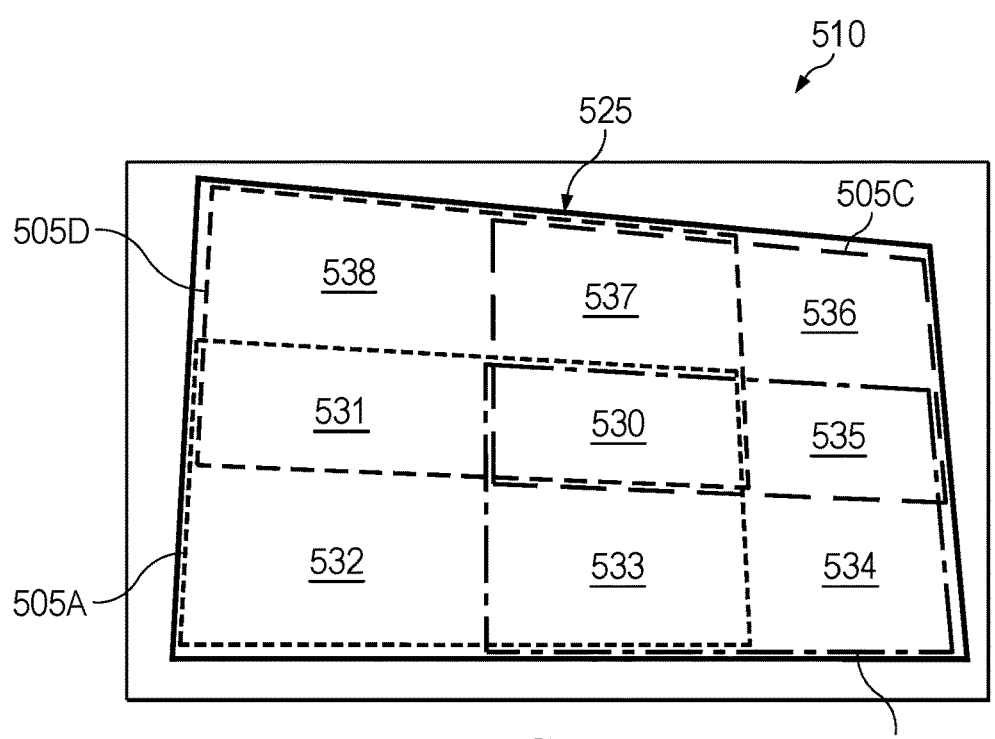

FIG. 5F shows a next step of the geometric calculations where the extrapolated lines connect the intersection points of the interior frames 520 to 523 to the sides of the overall exterior frame 525 to create eight corrected frames 530 to 538. For example, the corrected frame 530 in FIG. 5F represents the overlap between the interior frames 520, 521, 522, and 523 in FIG. 5E. The corrected frame 531 in FIG. 5F is determined by extrapolating the top and bottom sides of the corrected frame 530 to intersect with the left side of the overall exterior frame 525. Similarly, the corrected frames 532 to 538 can be determined based on the corrected frame 530 and the sides of the exterior frame 525.

The corrected quadrilaterals 505A to 505D can then be determined based on the corrected frames 530 to 538 within the overall exterior frame 525. For example, the corrected frames 530, 531, 532, and 533 are combined to determine the corrected quadrilateral 505A. Similarly, the corrected frames 530, 533, 534, and 535 determine the corrected quadrilateral 505B, the corrected frames 530, 535, 536, and 537 determine the corrected quadrilateral 505C, and the corrected frames 530, 531, 537, and 538 determine the corrected quadrilateral 505D.

Figure 6:
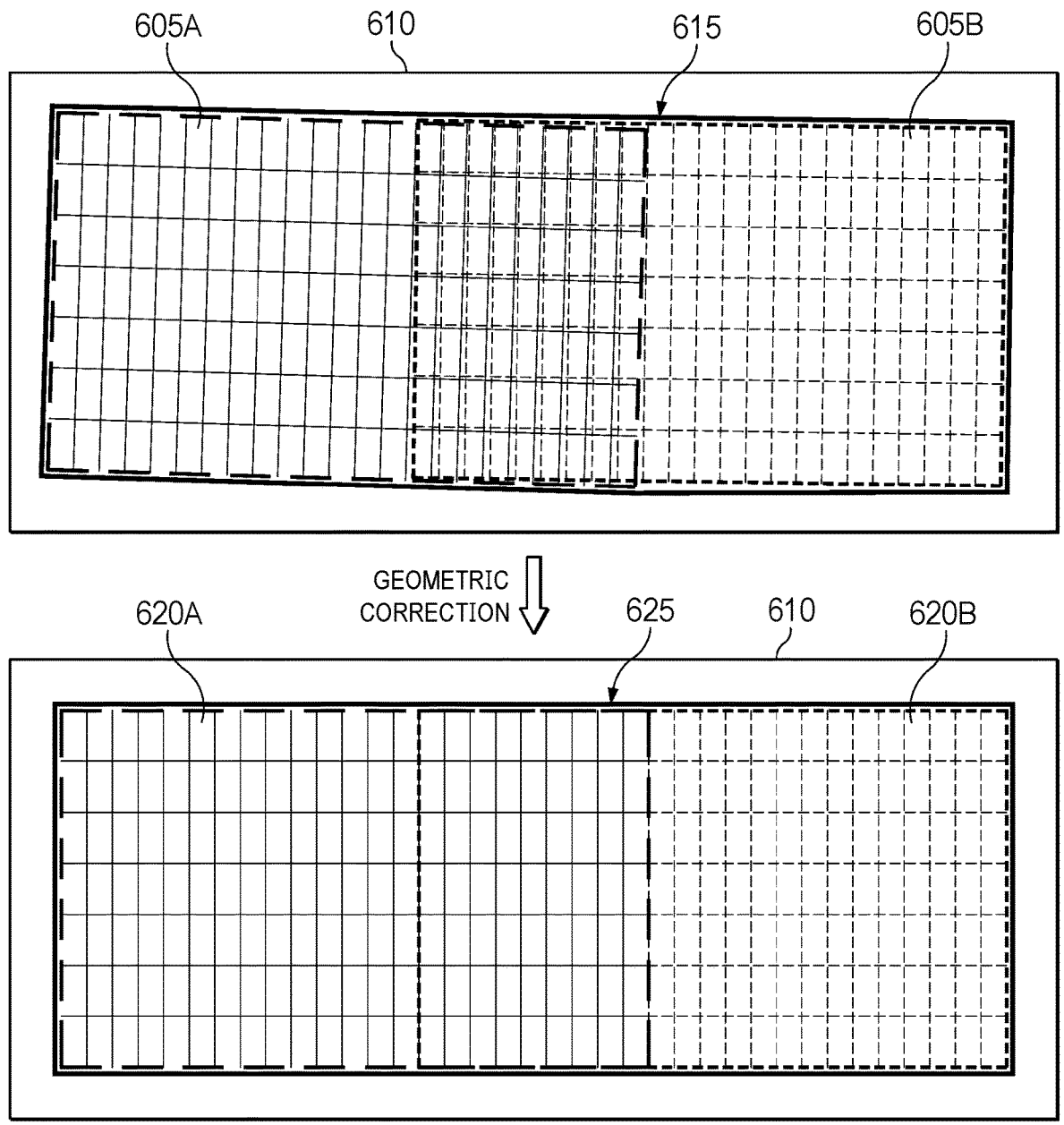
FIG. 6 is a diagram of a geometric correction for a 2×1 projector configuration, in accordance with various examples.

FIG. 6 is a diagram of a geometric correction for a 2×1 projector configuration, in accordance with various examples. Before geometric correction, two overlapping images 605A and 605B are projected, according to the 2×1 projector configuration, on an image projection surface 610 to display a larger combined image 615. For example, the projectors 105A and 105B in the display system 100 can be configured according to the 2×1 projector configuration to project the images 605A and 605B, respectively, in a 2×1 array on the image projection surface 110. The projection of the images 605A and 605B causes distortion in the displayed images 605A and 605B and accordingly in the combined image 615. The distortion in the images 605A and 605B changes the geometry of the images 605A and 605B on the image projection surface 610 in comparison to the initial geometry before projection, at the respective projector planes. For example, the images 605A and 605B are rectangle shaped images in the frames of reference of the respective light modulators, as processed by the display device 101. Because of the respective projection angles of the images 605A and 605B with respect to the image projections surface 610, the geometries of the images 605A and 605B are distorted on the plane of the image projection surface 610. The distorted images 605A and 605B can have quadrilateral non-rectangular geometries, as shown in FIG. 6. Because the projection angles of the images 605A and 605B can be different, the distorted geometries of the images 605A and 605B can also be different. Accordingly, the combined image 615 formed by the overlapping images 605A and 605B is also non-rectangular.

To perform geometric correction, the pair-wise homography transform is determined for the images 605A and 605B between two respective camera frames of reference. The images 605A and 605B are then mapped based on the pair-wise homography transform to a common camera frame of reference, such as the frame of reference of one of the two cameras, and processed to determine the respective corrected quadrilaterals. The images 605A and 605B can then be warped, by an image warping engine, based on the respective quadrilaterals to obtain the respective warped images 620A and 620B, which are then projected again on the image projection surface 610. As shown in FIG. 6, after the geometric correction, projecting the warped images 620A and 620B based on the respective quadrilaterals compensates for the distortion and corrects the geometries of the images 605A and 605B on the image projection surface 610. Accordingly, a corrected and rectangle shaped combined image 625 is displayed without distortion.

Figure 7:
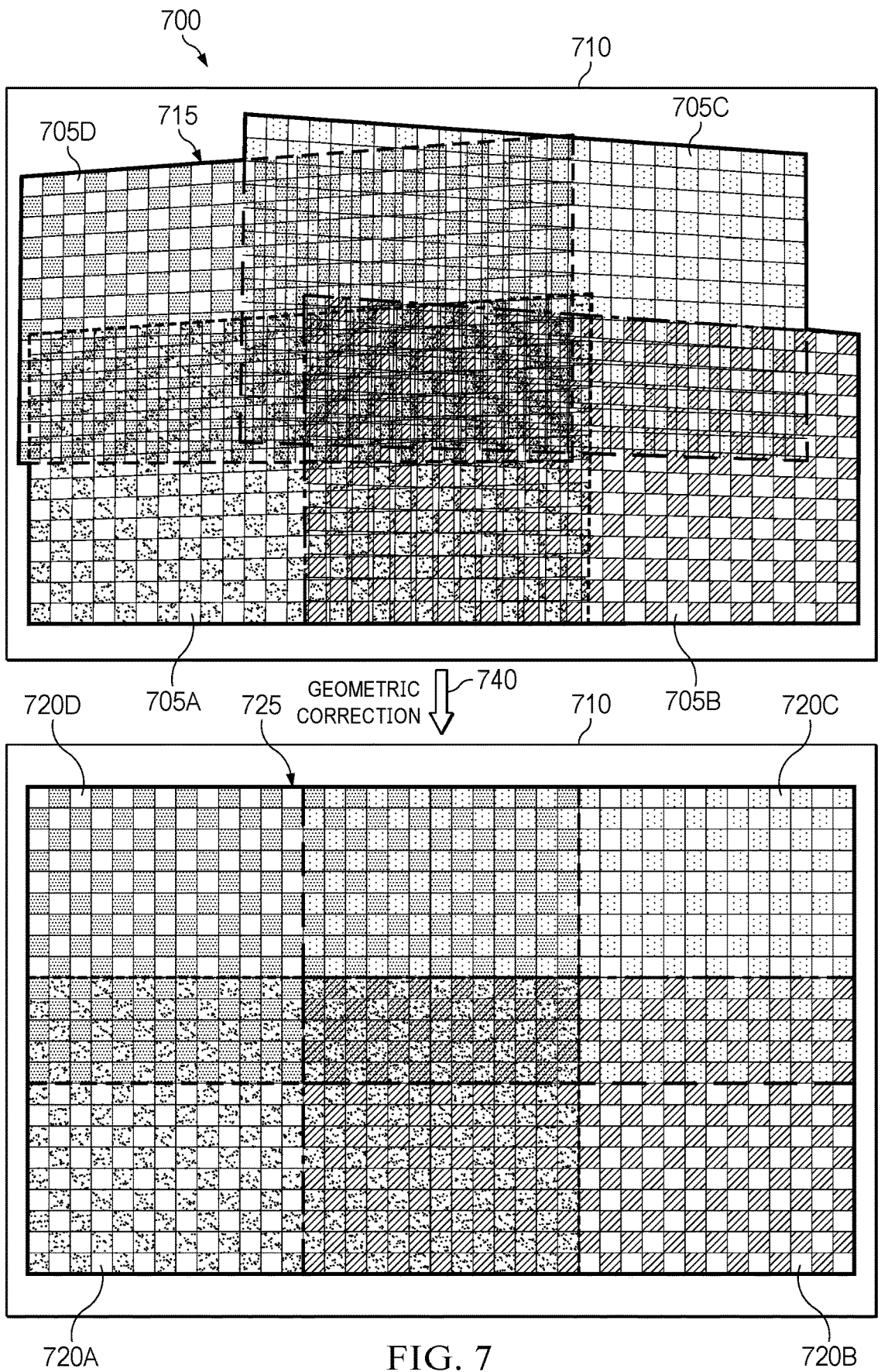
FIG. 7 is a diagram of a geometric correction for a 2×2 projector configuration, in accordance with various examples.

FIG. 7 is a diagram of a geometric correction for a 2×2 projector configuration, in accordance with various examples. Before geometric correction, four overlapping images 705A to 705D are projected, according to the 2×2 projector configuration, on an image projection surface 710 to display a larger combined image 715. For example, the projectors 205A to 205D in the display system 200 can be configured according to the 2×2 projector configuration to project the images 705A to 705D, respectively, in a 2×2 array on the image projection surface 710. The projection of the images 705A to 705D causes distortion in the displayed images 705A to 705D and accordingly in the combined image 715. The distortion in the images 705A to 705D changes the geometry of the images 705A to 705D on the image projection surface 710 in comparison to the initial geometry before projection, at the respective projector planes. For example, the images 705A to 705D are rectangle shaped images in the frames of reference of the respective light modulators, as processed by the display device 201. The geometries are distorted by the projection process on the plane of the image projection surface 710, which distorts the combined image 715.

To perform geometric correction, pair-wise homography transforms are determined for respective pairs of the images 705A to 705D, such as according to equations (1) and (2). The images 705A to 705D are then mapped based on the pair-wise homography transforms to a common camera frame of reference of one of the four cameras, and processed to determine the respective corrected quadrilaterals, such as according to the process 500. The images 705A to 705D can then be warped, by an image warping engine, based on the respective quadrilaterals to obtain the respective warped images 720A and 720B, which are then projected again on the image projection surface 610. As shown in FIG. 6, after the geometric correction, projecting the warped images 720A to 720D based on the respective quadrilaterals compensates for the distortion and corrects the geometries of the images 705A to 705D on the image projection surface 710. Accordingly, a corrected and rectangle shaped combined image 725 is displayed without distortion.

Figure 8:
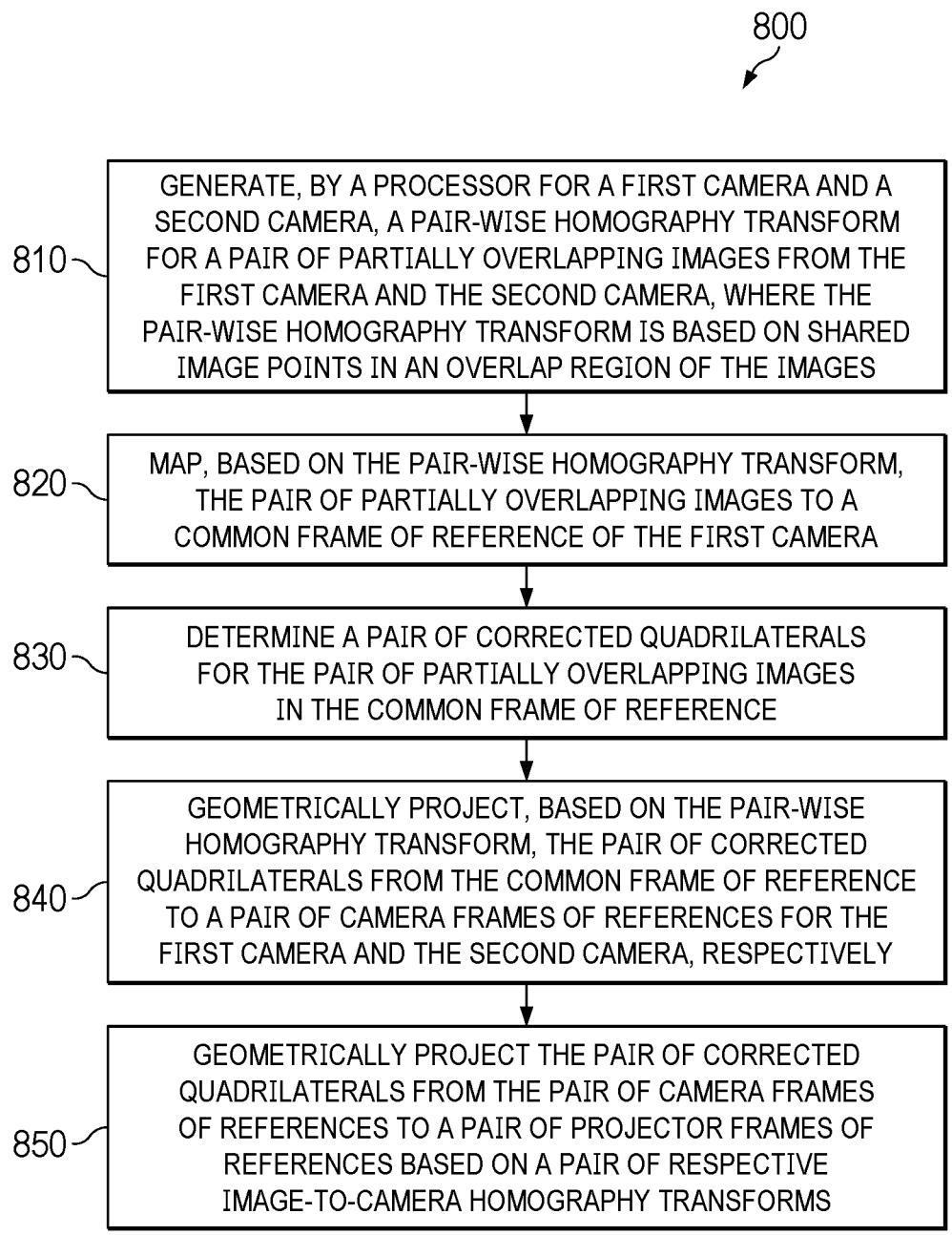
FIG. 8 is a flow diagram of a method of geometric correction for a projector configuration, in accordance with various examples.

FIG. 8 is a flow diagram of a method 800 of a geometric correction for a projector configuration, in accordance with various examples. For example, the method 800 can be performed by the display system 100 or the display system 200 for a 2×1 or 2×2 projector configuration. The method 800 is performed to determine the corrected quadrilaterals based on the pair-wise homography transforms for geometry correction in projection stacking.

At step 810 of the method 800, a processor generates for a first camera and a second camera, a pair-wise homography transform for a pair of partially overlapping images from the first camera and the second camera. The pair-wise homography transform is based on shared image points in an overlap region of the images. For example, the processor 190 of the display system 100 or the processor 290 of the display system 200 generates a pair-wise homography transform between the respective frames of reference of two cameras 180 or 280. A pair-wise homography transform can be generated based on four image points in the overlap region between the respective fields of views of the cameras, such as according to equation (1). In some examples, a pair-wise homography transform is generated for each pair of images, according to equations (1) and (2), in an m×n (e.g., 2×1, 1×2, 2×2, etc.) projector configuration, where m and n are integers.

At step 820, the processor maps, based on the pair-wise homography transform, the pair of partially overlapping images to a common frame of reference, such as the frame of reference of the first camera. For example, for a 2×2 array of partially overlapping images, the processor generates the pair-wise homography transforms 400 and maps the image points of three of the images from respective camera frames of reference to the first frame of reference of the first camera.

At step 830, the processor determines a pair of corrected quadrilaterals for the pair of partially overlapping images in the common frame of reference of the first camera. For example, for a 2×2 array of partially overlapping images, the four images in the common camera frame of reference based on pair-wise homography transforms, can be processed according to the process 500 to determine the respective corrected quadrilaterals.

At step 840, the processor geometrically projects, based on the pair-wise homography transform, the pair of corrected quadrilaterals from the common frame of reference to a pair of camera frames of reference for the first camera and the second camera, respectively. After determining each corrected quadrilateral in the common camera frame of reference, the corrected quadrilateral is geometrically projected back to a frame of reference of a respective camera. Each corrected quadrilateral of an image can be geometrically projected back to a respective camera frame of reference by processing the image points of the corrected quadrilateral with an inverse transform. The inverse transform is the inverse of the pair-wise homography transform which maps the image to the common camera frame of reference. For example, the second corrected quadrilateral 505B can be geometrically projected back to a respective camera frame of reference based on the inverse of the pair-wise homography transform which maps the image 501B to the common camera frame of reference 510. Similarly, the corrected quadrilaterals 505C and 505D are geometrically projected back to respective camera frames of reference based on inverse transforms to the pair-wise homography transforms which map the images 501C and 501D, respectively, to the common camera frame of reference 510.

At step 850, the processor geometrically projects the pair of corrected quadrilaterals from the pair of camera frames of reference to a pair of projector frames of reference based on a pair of respective image-to-camera homography transforms. A projector frame of reference represents mathematically a two-dimensional plane (e.g., Cartesian plane) for positioning the image points of an image at the respective projector or light modulator plane. The image-to-camera homography transform represents the mapping of the image points between frames of reference of respective light modulators (or projectors) and cameras. For example, an image-to-camera homography transform between a light modulator (or projector) and a camera can be obtained according to equation (1) based on respective image points between the light modulator (or projector) and the camera planes.

Figure 9:
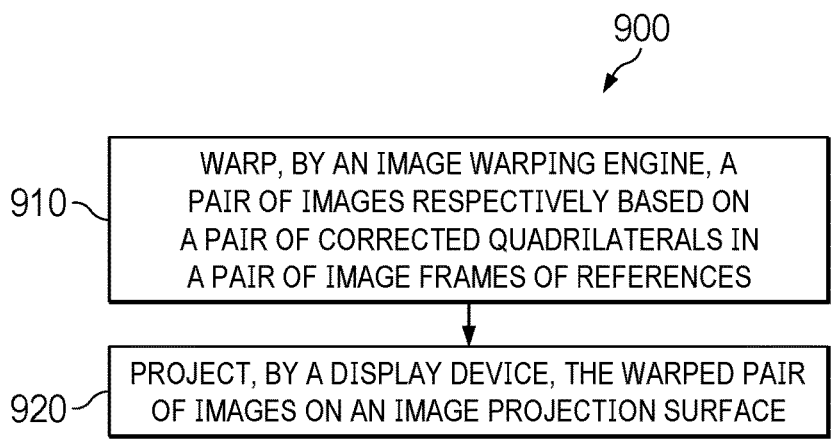
FIG. 9 is a flow diagram of a method of geometric correction for a projector configuration, in accordance with various examples.

FIG. 9 is a flow diagram of a method 900 of a geometric correction for a projector configuration, in accordance with various examples. The method 900 is performed to warp and project images with corrected geometries based on respective corrected quadrilaterals. The corrected quadrilaterals can be determined according to the method 800 which can be performed prior to the method 900. For example, the method 900 can be performed by the display system 100 or the display system 200 after performing the method 800 to obtain the corrected quadrilaterals. According to the method 800, the corrected quadrilaterals can be determined based on the pair-wise homography transforms. The method 900 is then performed based on the corrected quadrilateral for projection stacking, such as according to a 2×1 or 2×2 projector configuration.

At step 910 of the method 900, an image warping engine warps a pair of new images respectively based on a pair of corrected quadrilaterals in a pair of image frames of reference. The new images are images processed for projection to display a to-be-projected combined image with geometric correction based on the corrected quadrilaterals. At step 920, a display device projects the warped pair of images on an image projection surface. For example, the image warping engine 170 of the display device 101 warps to-be-projected images in a 2×1 or 2×1 projector configuration based on respective corrected quadrilaterals determined by the obtained from the processor 190 after performing the method 800. The to-be-projected images can be digital images processed by the processor 140 and warped by the image warping engine 170. The processor 140 sends the warped images to the controllers 130 of the projectors 105, which control accordingly the respective light modulators 115 to modulate and project the modulated light 112 on the image projection surface 110. The images are displayed accordingly with correct geometry and without distortion because of projection. Warping the to-be-projected images based on the respective corrected quadrilaterals mitigates distortion and corrects geometric alignment in the displayed to-be-projected combined image.

Figure 10:
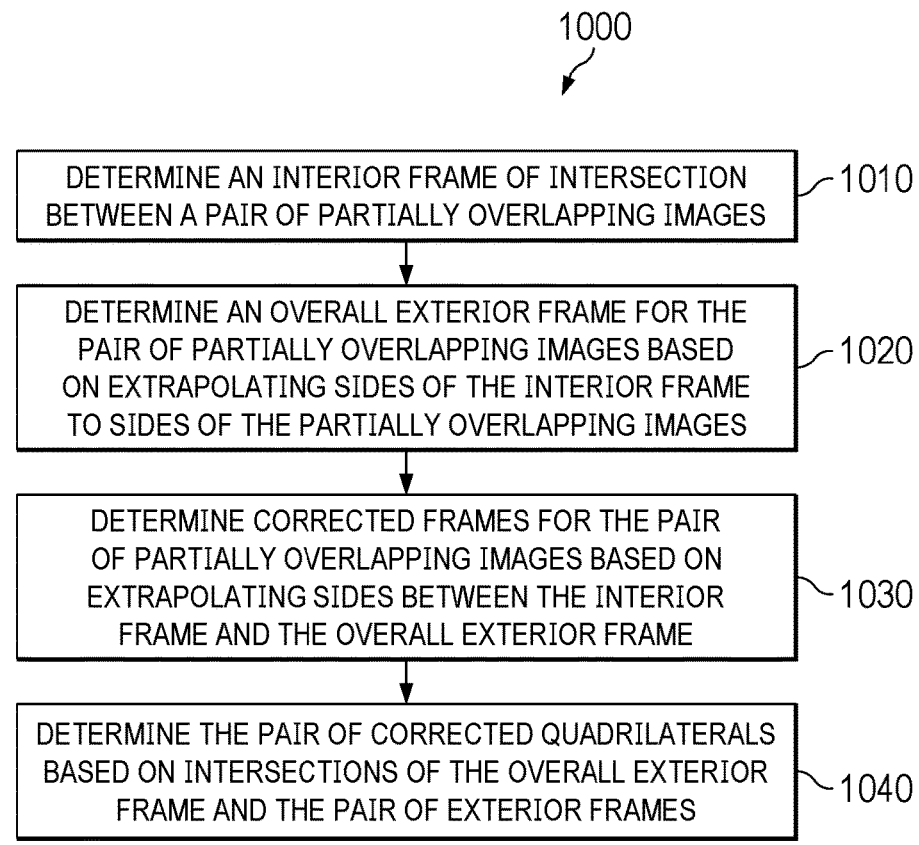
FIG. 10 is a flow diagram of a method of geometric correction for a projector configuration, in accordance with various examples.

FIG. 10 is a flow diagram of a method 1000 of a geometric correction for a projector configuration, in accordance with various examples. For example, the method 1000 can be performed by the display system 100 or the display system 200 for a 2×1 or 2×2 projector configuration. The method 1000 is performed to determine the corrected quadrilaterals for respective images in a common camera frame of reference. For example, the corrected quadrilaterals can be determined in the step 830 of the method 800, after mapping the images to a common camera frame of reference.

At step 1010 of the method 1000, an interior frame of intersection is determined between a pair of partially overlapping images. In projector configurations with more than one pair of partially overlapping images, such as a 2×2 projector configuration, the interior frame is determined for each pair of partially overlapping images. For example, the processor 190 of the display system 100 or the processor 290 of the display system 200 determines the intersections of sides of each pair of images 501 of the process 500 in a common camera frame of reference. The determined intersection points between the sides are connected to obtain the interior frames 520 to 523 for the images 501A to 501D.

At step 1020, an overall exterior frame is determined for the pair of partially overlapping images based on extrapolating sides of the interior frame to sides of the partially overlapping images. For example, the processor 190 or the processor 290 determines, according to the process 500, the overall exterior frame 525 based on the interior frames 520 to 523 by extrapolating the exterior sides of the interior frames 520 to 523 to intersect with the exterior sides of the images 501. The four points located by the intersection of the different sides are connected to obtain the overall exterior frame 525.

At step 1030, corrected frames are determined for the pair of partially overlapping images based on extrapolating sides between the interior frame and the overall exterior frame. For example, the processor 190 or the processor 290 determines, in the process 500, the corrected frames 530 to 538 by locating the four common intersection points between the interior frames 520 to 523. The four points are then connected by four lines. The lines are extrapolated to intersect with the sides of the overall exterior frame 525 and define the corrected frames 530 to 538.

At step 1040, the pair of corrected quadrilaterals are determined based on the corrected frames. For example, the processor 190 or the processor 290 determines the corrected quadrilaterals 505A to 505D based on the corrected frames 530 to 538 and the overall exterior frame 525 in the process 500. Each four adjacent corrected frames at each corner of the overall exterior frame 525 are combined to form four overlapping quadrants which represents four corrected quadrilaterals for the four partially overlapping images in the common camera frame of reference.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A device that is described herein as including certain components may instead be coupled to those components to form the described device. For example, a structure described as including one or more elements (such as one or more processors and/or controllers) may instead include one or more elements within a single physical device (e.g., a display device) and may be coupled to at least some of the elements to form the described structure either at a time of manufacture or after a time of manufacture, for example, by an end-user and/or a third-party.

While certain components may be described herein as being of a particular process technology, these components may be exchanged for components of other process technologies. Device components described herein are reconfigurable to include the replaced components to provide functionality at least partially similar to functionality available prior to the component replacement.

In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. An apparatus, comprising:
a first camera configured to capture a first image of a first displayed image, the first camera having a first field of view;
a second camera configured to capture a second image of a second displayed image, the second camera having a second field of view; and
a processor coupled to the first camera and to the second camera, the processor configured to:
generate a pair-wise homography transform for the first camera and the second camera;
map, based on the pair-wise homography transform, the second image from a second frame of reference of the second camera to a first frame of reference of the first camera;
determine a first corrected quadrilateral for the first image in the first frame of reference;
determine a second corrected quadrilateral for the second image in the first frame of reference;
geometrically project, based on the pair-wise homography transform, the second corrected quadrilateral from the first frame of reference to the second frame of reference of the second camera;
geometrically project, based on a first image-to-camera homography transform, the first corrected quadrilateral from the first frame of reference of the first camera to a first projector frame of reference for projecting the first image; and
geometrically project, based on a second image-to-camera homography transform, the second quadrilateral from the second frame of reference of the second camera to a second projector frame of reference for projecting the second image.

2. The apparatus of claim 1, wherein the pair-wise homography transform is determined based on image points of the first displayed image that are captured by the first camera and the second camera in an overlap region between the first field of view of the first camera and the second field of view of the second camera.

3. The apparatus of claim 1, wherein the apparatus further comprises a display device configured to project the first displayed image and the second displayed image simultaneously to display a combined image, and wherein the display device comprises:
a first light modulator configured to project the first displayed image; and
a second light modulator configured to project the second displayed image.

4. The apparatus of claim 3, wherein the display device is further configured to project a first new image and a second new image simultaneously to display a new combined image, wherein the display device further comprises an image warping engine configured to warp first new images based on the first corrected quadrilateral in the first projector frame of reference and to warp second new images based on the second corrected quadrilateral in the second projector frame of reference, wherein the first light modulator is configured to modulate light to project the warped first new images, and wherein the second light modulator is configured to modulate light to project the warped second new images.

5. The apparatus of claim 3, wherein the display device is configured to project the first image and the second image in a 2×1 projector configuration on a planar surface, wherein the first image and the second image are two-dimensional images.

6. A method comprising:
- obtaining, by a processor, a first image from a first frame of reference and a second image from a second frame of reference, the second image overlapping the first image;
- generating, by the processor, a pair-wise homography transform for the first image and the second image, wherein the pair-wise homography transform is based on shared image points in an overlap region between the first image and the second image;
- mapping, by the processor, based on the pair-wise homography transform, the second image from the second frame of reference to the first frame of reference;
- determining, by the processor, a first corrected quadrilateral and a second corrected quadrilateral for the respective first image and the second image in the first frame of reference; and
- geometrically projecting, by the processor, based on the pair-wise homography transform, the second corrected quadrilateral from the first frame of reference to the second frame of reference.

7. The method of claim 6, further comprising:
- geometrically projecting, by the processor, the first corrected quadrilateral from the first frame of reference to a first projector frame of reference based on a first one of the pair-wise homography transforms;
- geometrically projecting, by the processor, the second corrected quadrilateral from the second frame of reference to a second projector frame of reference based on a second one of the pair-wise homography transforms;
- warping, by an image warping engine a first to-be-projected image based on the first corrected quadrilateral in the first projector frame of reference; and
- warping, by the image warping engine, a second to-be-projected image based on the second corrected quadrilateral in the second projector frame of reference.

8. The method of claim 6, wherein the image points in the overlap region are four image points of the first image and the second image.

9. The method of claim 8, wherein the four image points include a first image point at a top left corner of the first image, a second image point at a bottom left corner of the first image, a third image point at a top right corner of the second image, and a fourth image point at a bottom right corner of the second image.

10. The method of claim 8, wherein the pair-wise homography transforms are generated independently from image points outside the overlap region.

11. The method of claim 6, wherein the first corrected quadrilateral and the second corrected quadrilateral are determined based on a center of gravity (COG) calculation.

12. The method of claim 6, wherein determining the first corrected quadrilateral and determining the second corrected quadrilateral comprises:
- determining an interior frame of intersection between the first image and the second image;
- determining an overall exterior frame for the first image and the second image based on extrapolating sides of the interior frame to sides of the first image and the second image;
- determining corrected frames for the first image and the second image based on extrapolating sides between the interior frame and the overall exterior frame; and
- determining the first corrected quadrilateral and the second corrected quadrilateral based on the corrected frames.

13. The method of claim 6, wherein the pair-wise homography transform is a first pair-wise homography transform, wherein the overlap region is a first overlap region, and wherein the method further comprises:
- generating, by the processor, a second pair-wise homography transform for a third image and a fourth image, wherein the second pair-wise homography transform is based on image points in a second overlap region between the third image and the fourth image;
- generating, by the processor, a third pair-wise homography transform for the first image and the fourth image, wherein the third pair-wise homography transform is based on image points in a third overlap region between the first image and the fourth image;
- mapping, based on the first pair-wise homography transform, the second image to a first frame of reference for the first image;
- mapping, based on the second pair-wise homography transform, the third image to the first frame of reference; and
- mapping, based on the second pair-wise homography transform and the third pair-wise homography transform, the fourth image to the first frame of reference.

14. The method of claim 13, further comprising:
- determining, in the first frame of reference, a first corrected quadrilateral for the first image, a second corrected quadrilateral for the second image, a third corrected quadrilateral for the third image, and a fourth corrected quadrilateral for the fourth image;
- geometrically projecting, based on the first pair-wise homography transform, the second corrected quadrilateral from the first frame of reference to a second frame of reference for the second image;
- geometrically projecting, based on the second pair-wise homography transform, the third corrected quadrilateral from the first frame of reference to a third frame of reference for the third image; and
- geometrically projecting, based on the second pair-wise homography transform and the third pair-wise homography transform, the fourth corrected quadrilateral from the first frame of reference to a fourth frame of reference for the fourth image.

15. The method of claim 14, further comprising:
- geometrically projecting the first corrected quadrilateral from the first frame of reference to a first projector frame of reference of the first image based on a first homography transform;
- geometrically projecting the second corrected quadrilateral from the second frame of reference to a second projector frame of reference of the second image based on a second homography transform;
- geometrically projecting the third corrected quadrilateral from the third frame of reference to a third projector frame of reference of the third image based on a third homography transform;
- geometrically projecting the fourth corrected quadrilateral from the fourth frame of reference to a fourth projector frame of reference of the fourth image based on a fourth homography transform; and
- warping, by an image warping engine, to-be-projected images in the first projector frame of reference, the second projector frame of reference, the third projector frame of reference, and the fourth projector frame of reference based on the first corrected quadrilateral, the second corrected quadrilateral, the third corrected quadrilateral, and the fourth corrected quadrilateral, respectively.

16. The method of claim 13, wherein the first image, the second, the third image, and the fourth image are geometrically projected in a 2×2 array and are partially overlapping in the first frame of reference.

17. A system, comprising:
- a first light modulator configured to project a first display image;
- a second light modulator configured to project a second display image simultaneously with the first display image to display a combined image, wherein the first display image and the second display image are partially overlapping in the combined image;
- a first camera configured to capture a first image of the combined image, the first camera having a first field of view;
- a second camera configured to capture a second image of the combined image, the second camera having a second field of view; and
- a processor coupled to the first light modulator and the second light modulator, the processor configured to:
  - generate a pair-wise homography transform for the first image and the second image;
  - determine, in a common frame of reference for the first camera and the second camera, a first corrected quadrilateral for the first image and a second corrected quadrilateral for the second image based on the pair-wise homography transform; and
  - geometrically project the first quadrilateral to a first projector frame of reference and the second quadrilateral to a second projector frame of reference based on a first homography transform and a second homography transform, respectively.

18. The system of claim 17, wherein the first light modulator is further configured to project a first to-be-projected image, wherein the second light modulator is further configured to project a second to-be-projected image simultaneously with the first to-be-projected image to display a to-be-projected combined image, and wherein the system further comprises an image warping engine configured to:
- warp the first to-be-projected image in the first projector frame of reference based on the first corrected quadrilateral; and
- warp the second to-be-projected image in the second projector frame of reference based on the second corrected quadrilateral, respectively.

19. The system of claim 18, wherein warping the first to-be-projected image based on the first corrected quadrilateral and the second to-be-projected image based on the second corrected quadrilateral mitigates distortion and corrects geometric alignment in the to-be-projected combined image.

20. The system of claim 17, wherein the pair-wise homography transform represents a mapping of image points between the first projector frame of reference of the first camera and the second projector frame of reference of the second camera, and wherein the first homography transform and the second homography transform represent mappings of image points from the first projector frame of reference and the second projector frame of reference to the first projector frame of reference of the first camera and the second projector frame of reference of the second camera, respectively.

* * * * *